(12) United States Patent
Nakao et al.

(10) Patent No.: US 7,674,930 B2
(45) Date of Patent: Mar. 9, 2010

(54) POLYESTER POLYOL AND POLYURETHANE RESIN

(75) Inventors: Kazunori Nakao, Otake (JP); Nobuyuki Watanabe, Otake (JP)

(73) Assignee: Daicel Chemical Industries, Ltd., Osaka-shi (JP)

( * ) Notice: Subject to any disclaimer, the term of this patent is extended or adjusted under 35 U.S.C. 154(b) by 185 days.

(21) Appl. No.: 11/990,778

(22) PCT Filed: Aug. 3, 2006

(86) PCT No.: PCT/JP2006/315395
§ 371 (c)(1),
(2), (4) Date: Feb. 21, 2008

(87) PCT Pub. No.: WO2007/023655

PCT Pub. Date: Mar. 1, 2007

(65) Prior Publication Data
US 2009/0247674 A1 Oct. 1, 2009

(30) Foreign Application Priority Data
Aug. 24, 2005 (JP) ............................. 2005-243435

(51) Int. Cl.
*C07C 69/66* (2006.01)
(52) U.S. Cl. .................. 560/185; 560/303; 560/309; 428/800; 428/842.3; 428/844.8; 564/500
(58) Field of Classification Search ............... 560/185, 560/303, 309; 564/500; 428/842.3, 800, 428/844.8
See application file for complete search history.

(56) References Cited

U.S. PATENT DOCUMENTS

| | | | |
|---|---|---|---|
| 4,080,315 A | * | 3/1978 | Login .................... 528/290 |
| 4,322,324 A | | 3/1982 | Mizuguchi et al. |
| 4,870,129 A | | 9/1989 | Henning et al. |

FOREIGN PATENT DOCUMENTS

JP          53-15874 B       5/1978

(Continued)

*Primary Examiner*—Randy Gulakowski
*Assistant Examiner*—Michael Leonard
(74) *Attorney, Agent, or Firm*—Birch, Stewart, Kolasch & Birch, LLP

(57) ABSTRACT

To prepare a polyester polyol in which a lactone is ring-opening addition polymerized with the compound represented by formula (I).

[Formula 1]

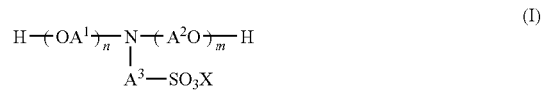

(I)

(wherein each of $A^1$ and $A^2$ represents an alkylene group having not less than 2 carbon atoms, $A^3$ represents an alkylene group, X represents a cationic component, and each of n and m represents an integer of not less than 1.)

The polyester polyol has a high hydrophilic group and high solubility in a solvent (particularly, a low-boiling organic solvent used in the production of a polyurethane) and can design an aqueous polyurethane desirably and produce the aqueous polyurethane.

17 Claims, 2 Drawing Sheets

FOREIGN PATENT DOCUMENTS

| | | |
|---|---|---|
| JP | 56-151727 A | 11/1981 |
| JP | 63-29882 A | 3/1988 |
| JP | 9-302220 A | 11/1997 |
| JP | 2001-48858 A | 2/2001 |
| JP | 2001-354742 A | 12/2001 |
| JP | 2004-307833 A | 11/2004 |
| JP | 2005-15500 A | 1/2005 |
| WO | WO-02/36654 A2 | 5/2002 |

* cited by examiner

POLYESTER POLYOL AND POLYURETHANE RESIN

TECHNICAL FIELD

The present invention relates to a novel polyester polyol having a sulfonic acid (salt) group, a polyurethane resin obtained from the polyester polyol, and a process for producing the polyurethane resin.

BACKGROUND ART

Many processes for modifying the characteristics of the polymers comprising introducing polar groups, e.g., anionic groups (such as a sulfonic acid group and a carboxylic acid group) and cationic groups (such as a quaternary ammonium group) as constitutional units of polymers, have been known.

Polyurethane resins have excellent flexibilities or mechanical properties and have been widely used for various applications. In the introduction of a polar group into a polyurethane resin, a diol component having a polar group is usually employed as a raw material. In the introduction of a cationic group, a variety of diol components having quaternary ammonium groups are known. On the other hand, in the introduction of an anionic group into a polyurethane resin, a diol component having a sulfonic acid group or a carboxylic acid group (and a salt thereof) is used.

In the polyurethane resin, particularly, regarding an aqueous solution or an aqueous dispersion of polyurethane resin, processes for producing an aqueous solution or an aqueous dispersion of polyurethane resin has been proposed, for example, a process comprising dispersing a polyurethane resin in water by using a surfactant (a dispersing agent) and a process comprising using a hydrophilic polyol (such as a polyethylene glycol) as a polyol component to give a self-dispersed urethane resin. From the viewpoints of the performances or the water resistance of the resin, introducing a hydrophilic group such as an anionic group or a cationic group into a polyurethane resin is advantageous to a process for producing an aqueous solution or an aqueous dispersion of polyurethane resin.

In the introduction of a polar group such as a hydrophilic group into a urethane resin, using a raw material monomer or oligomer having such a polar group in synthesis of a polymer has been generally known. The introduction of a polar group into a polyurethane resin usually employs a diol component having a polar group [e.g., a sulfonic acid group or a carboxylic acid group (and a salt thereof)] as a raw material.

Regarding the introduction of a polar group into a polyurethane resin, an introduction of a carboxyl group into a polyurethane resin is disclosed. For example, a process for producing a water-soluble polyurethane resin disclosed in Japanese Examined Patent Application Publication No. 15874/1978 (JP-53-15874B, Patent Document 1) comprises allowing a polyisocyanate or a urethane prepolymer having an isocyanate group at a terminal thereof to react with a polyhydroxy compound obtained by a reaction of a polycarboxylic acid anhydride with diethanolamine or hydroxylamine and having at least one carboxyl group and allowing the reaction product to react with an organic amine, ammonia or an inorganic base. However, in this process, the introduction of a carboxyl group into a hard segment of the polyurethane in the chain extension increases the aggregation of the polyurethane, and a sufficient water-solubility or water dispersibility is not obtained. Moreover, a high-boiling polar solvent (e.g., dimethylformamide) has a higher compatibility with a polyurethane than a low-boiling polar solvent and is used for the reaction in the production of the polyurethane. The high-boiling polar solvent is difficult to remove after hydrophilization of the polyurethane and consequently remains in the aqueous resin. In addition, a carboxyl group is a weak anion and has an insufficient effect on the modification of the polymer.

Further, an introduction of a carboxylate group and/or a sulfonate group is disclosed in Japanese Patent Application Laid-Open Publication No. 69882/1988 (JP-63-69882A, Patent Document 2). The process comprises using a diol component or a diaminosulfonic acid such as sodium N-(2-aminoethyl)-2-aminoethanesulfonate or sodium dimethylolpropionate as a chain extender in a urethane synthesis to introduce a carboxylate group and/or a sulfonate group. However, even in this introduction, a sulfonic acid (a salt thereof) group is introduced into a hard segment of the polyurethane, which increases the aggregation and cannot give the sufficient water-solubility or water dispersibility.

Furthermore, Japanese Patent Application Laid-Open Publication No. 354742/2001 (JP-2001-354742A, Patent Document 3) suggests an aqueous solution and an aqueous dispersion of an aqueous polyurethane resin containing a salt of N,N-bis(2-hydroxyethyl)-2-aminoethanesulfonic acid quaternary ammonium through a urethane bond in a molecular chain thereof. However, in particular, a diol component having a high content of a sulfonate group, e.g., N,N-bis(2-hydroxyethyl)-2-aminoethanesulfonic acid salt, is hardly soluble or insoluble in a low-boiling organic solvent used in a production of the polyurethane and difficult to use. Accordingly, a composition or molecular weight of an oligomer is limited and a molecular design of a polyurethane resin is prevented. Incidentally, a combination use of the low-boiling organic solvent and a high-boiling polar solvent (such as dimethylformamide or N-methylpyrrolidone) as a reaction solvent in the reaction makes it difficult to remove the high-boiling solvent used in the reaction after hydrophilization, and the high-boiling organic solvent consequently remains in the aqueous resin.

In addition, the following introductions of a sulfonic acid group have been known: a process comprises once dissolving a N,N-bis(2-hydroxyethyl)-2-aminoethanesulfonic acid tetraethylammonium salt in N,N-dimethylacetamide, and allowing the salt to react with an isocyanate to introduce a sulfonic acid group into a polyurethane resin [Japanese Patent Application Laid-Open Publication No. 48858/2001 (JP-2001-48858A, Patent Document 4)] and a process comprises transesterifying sodium 5-sulfodimethyl isophthalate by using a solvent (e.g., ethyleneglycol, dimethylacetoamide, and manganese acetate), removing methanol, and allowing the reaction product to react with an isocyanate to introduce a sulfonic acid group into a polyurethane resin [Japanese Patent Application Laid-Open Publication No. 15500/2005 (JP-2005-15500A, Patent Document 5)]. However, in these processes, the content ratio of the sulfonic acid group is inevitably decreased and the compositions or molecular weights of oligomers are restricted, which prevents the molecular design of a polyurethane resin.

[Patent Document 1] JP-53-15874B (Claims, and page 3, the fifth column, lines 24 to 27)

[Patent Document 2] JP-63-69882A (Claims, and page 5, lower right column, line 11 to page 6, upper left column, line 3)

[Patent Document 3] JP-2001-354742A (Claim 1, Examples)

[Patent Document 4] JP-2001-48858A (Claim 1, Examples)

[Patent Document 5] JP-2005-15500A (Claim 4, Examples)

DISCLOSURE OF THE INVENTION

Problems to be Solved by the Invention

It is therefore an object of the present invention to provide a polyester polyol having a high hydrophilic group and high solubility in a solvent (particularly, a low-boiling organic solvent used in a production of a polyurethane) and capable of designing a molecule of an aqueous polyurethane desirably and producing the aqueous polyurethane, a process for producing the polyester polyol, a polyurethane resin obtainable from the polyester polyol, and a process for producing the polyurethane resin.

An another object of the present invention is to provide a polyester polyol having a high reactivity with an isocyanate and capable of producing a polyurethane resin having a high hydrophilicity, a process for producing the polyester polyol, a polyurethane resin obtainable from the polyester polyol, and a process for producing the polyurethane resin.

A further object of the present invention is to provide a polyester polyol having a strong resistance against hydrolysis and is urethanized in a mild acid pH range, a process for producing the polyester polyol, a polyurethane resin obtainable from the polyester polyol, and a process for producing the polyurethane resin.

Means to Solve the Problems

The inventors of the present invention made intensive studies to achieve the above objects and finally found that a polyester polyol in which a lactone is ring-opening addition polymerized with an amino$C_{1-4}$alkanesulfonic acid having a $C_{2-4}$alkylene oxide (e.g., ethylene oxide) added thereto has a high hydrophilic group and high solubility in a solvent and is suitable for a production of an aqueous polyurethane resin. The present invention has accomplished based on the above-mentioned findings.

That is, the polyester polyol of the present invention in which a lactone is ring-opening addition polymerized with a compound represented by formula (I).

[Formula 1]

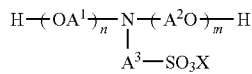

(wherein each of $A^1$ and $A^2$ represents an alkylene group having not less than 2 carbon atoms, $A^3$ represents an alkylene group, X represents a cationic component, and each of n and m represents an integer of not less than 1.)

In the above-mentioned formula (I), each of $A^1$ and $A^2$ may be a $C_{2-4}$alkylene group, $A^3$ may be a $C_{1-4}$alkylene group, X may be a metal ion or a quaternary ammonium compound, and n and m may be 1 or 2 respectively. The above-mentioned compound (I) may be a compound represented by the formula (II).

[Formula 2]

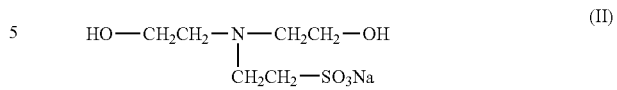

The above-mentioned lactone may include a $C_{4-8}$lactone such as a caprolactone. The above-mentioned polyester polyol may have a hydroxyl value of about 35 to 295 KOHmg/g (particularly, about 40 to 280 KOHmg/g) and an acid value of not more than 5 KOHmg/g (particularly, about 0.01 to 5 KOHmg/g).

The present invention also includes a process for producing a polyester polyol that comprises ring-opening addition polymerizing a lactone with a compound represented by the formula (I).

[Formula 3]

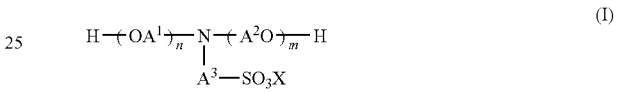

(In the formula, $A^1$, $A^2$, $A^3$, X, n, and m have the same meanings as defined above.)

The proportion of the above-mentioned lactone may be about 1.5 to 100 moles relative to 1 mole of the compound represented by the formula (I). In the above-mentioned process, the ring-opening addition polymerization may be carried out in the presence of at least one stabilizer selected from the group consisting of a phenolic compound, an organic phosphorus compound, and a hindered amine-series compound. The proportion of the stabilizer relative to 100 parts by weight of the total amount of the starting materials may be, for example, about 0.001 to 1 part by weight. Further, in the above-mentioned process, the ring-opening addition polymerization may be carried out by adding at least one polymerization catalyst selected from the group consisting of an organotitanium-series compound, an organotin-series compound, and a tin halide-series compound, in a proportion of about 0.1 to 1000 ppm (by weight) relative to the total amount of the starting materials.

The present invention may also include a polyurethane resin containing the above-mentioned polyester polyol as a constitutional unit. The polyurethane resin may be in the form of an aqueous emulsion or in the form of an aqueous solution.

Moreover, the present invention includes a process for producing a polyurethane resin that comprises allowing a polyol component at least comprising the above-mentioned polyester polyol to react with an organic polyisocyanate. In particular, an aqueous emulsion comprising a polyurethane resin may be obtained by allowing a polyol component having at least the above-mentioned polyester polyol to react with an organic polyisocyanate in a solvent inactive to an isocyanate group, adding a chain extender and a water to the reaction mixture, and distilling off the above-mentioned solvent. In this process, an equivalent ratio of the isocyanate group relative to the active hydrogen group of the polyol component (the isocyanate group/the active hydrogen group) may be, for example, about 1/1 to 2/1.

Effects of the Invention

Since the polyester polyol of the present invention is a specific polyester polyol having a sulfonic acid (salt) group, the polyester polyol of the present invention has a high hydrophilic group and high solubility in a solvent (particularly, a low-boiling organic solvent (or an organic solvent having a low boiling point) used in the production of a polyurethane) and is capable of designing molecule of an aqueous polyurethane resin desirably and producing the aqueous polyurethane resin. The polyester polyol also has a high reactivity with an isocyanate and facilitates a production of polyurethane resin having a high hydrophilicity. Further, the polyester polyol has a strong resistance against hydrolysis and is urethanized in the range of mild acid pH.

DETAILED DESCRIPTION OF THE INVENTION

[Polyester Polyol]

Figure 1:
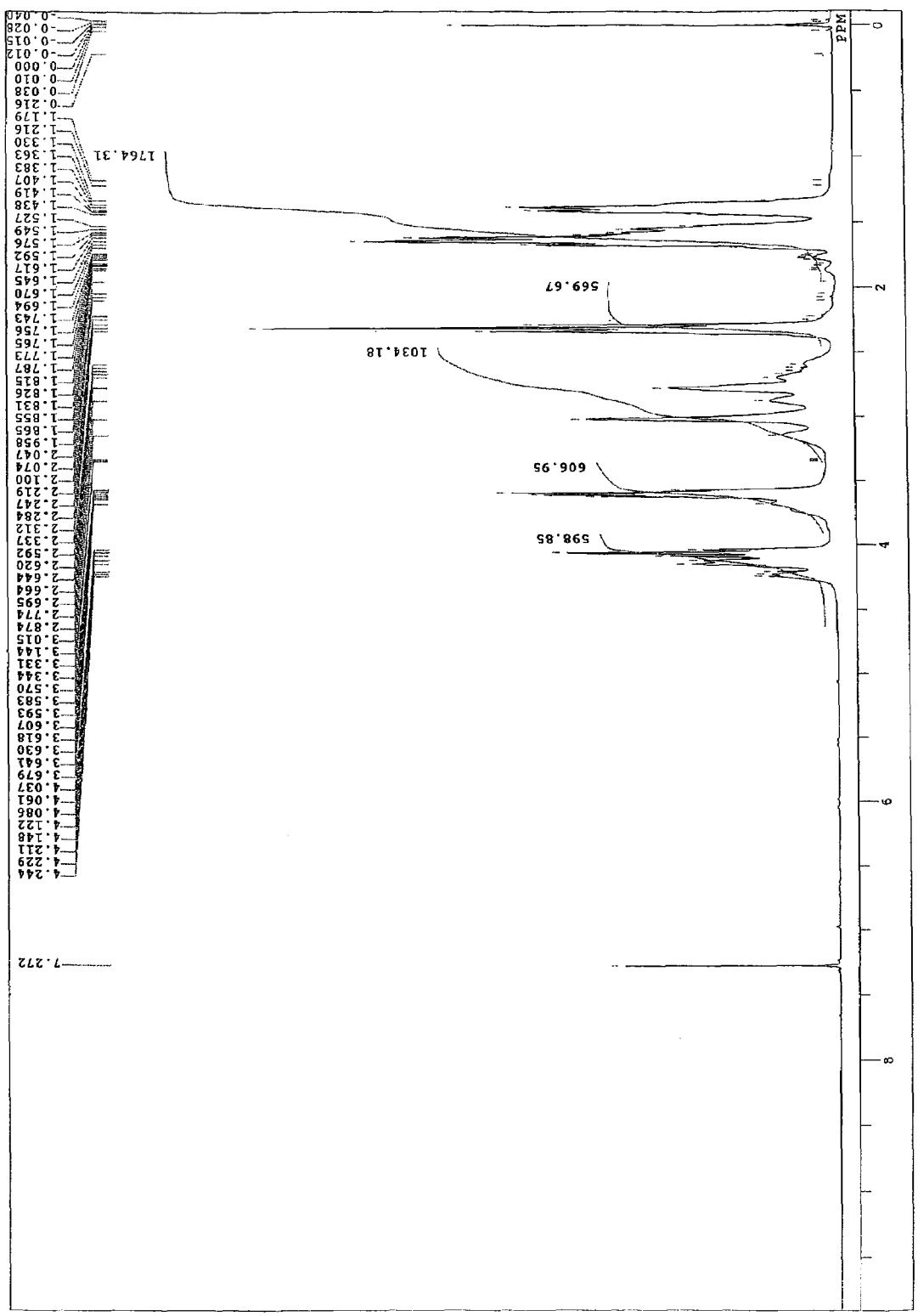
FIG. 1 shows a $^1$H-NMR spectrum of the polyester polyol obtained in Example 1.

The polyester polyol of the present invention is a polyester polyol in which a lactone is ring-opening addition polymerized with the compound represented by the above-mentioned formula (I). Since the lactone is ring-opening addition polymerized with the compound, the polyester polyol has a higher solubility in a solvent and is easy to handle in comparison with a conventional N,N-bis(2-hydroxyethyl)-2-aminoethanesulfonic acid salt. Moreover, since the polyester polyol has primary hydroxyl groups at terminals, the polyester polyol has a good reactivity with an isocyanate group, ensures the desirable molecular design of a polyurethane resin, and is suitable for a production of an aqueous polyurethane resin.

In the Formula (I), the alkylene groups, $A^1$ and $A^2$, are not particularly limited to specific ones as long as the alkylene groups contain not less than 2 carbon atoms. These alkylene groups usually include a $C_{2-4}$alkylene group such as ethylene, propylene, and butylene group. In the alkylene groups, a $C_{2-3}$alkylene group such as ethylene or propylene, particularly, ethylene group is preferred.

The numbers of repetition of $A^1$ and $A^2$ are n and m respectively, and each of n and m represents an integer of not less than 1. Each of n and m may be selected from the range of about 1 to 10, for example, 1 to 5, preferably 1 to 3, more preferably 1 or 2. Both of n and m are usually 1.

The alkylene group, $A^3$, is not particularly limited to a specific one and usually includes a $C_{1-4}$alkylene group such as methylene, ethylene, propylene, or butylene group. In the alkylene groups, a $C_{2-3}$alkylene group such as ethylene or propylene, particularly ethylene group is preferred.

The cationic component, X, may include a metal ion, a quaternary ammonium compound, an inorganic base, an organic base, and others. The metal ion may include, for example, an alkali metal ion (for example, lithium ion, sodium ion, and potassium ion) and an alkaline earth metal ion (for example, magnesium ion, calcium ion, and barium ion).

The quaternary ammonium compounds may include, e.g., an ammonium ion (for example, tetraC$_{1-18}$alkylammonium ion such as tetramethylammonium, tetraethylammonium, tetrabutylammonium, or lauryltrimethylammonium; and a benzyltriC$_{1-18}$alkylammonium ion such as benzyltrimethylammonium or benzyltriethylammonium), a pyrrolidinium ion (for example, N,N-dimethylpyrrolidinium ion, N-methyl-N-benzylpyrrolidinium ion, and N,N-dibenzylpyrrolidinium ion), and an ion corresponding to the pyrrolidinium ion (such as a piperidinium ion, a pyridinium ion, a picolynium ion, or a morpholynium ion.

The inorganic base is an inorganic compound capable of forming a salt with a sulfonic acid group and may include, for example, ammonia, ammonium hydroxide, an alkali metal hydroxide such as sodium hydroxide or potassium hydroxide; an alkali metal carbonate such as sodium carbonate, sodium hydrogencarbonate, potassium carbonate, or potassium hydrogencarbonate; an alkaline earth metal hydroxide such as calucium hydroxide or magnesium hydroxide; and an alkali earth metal carbonate such as calcium carbonate.

The organic base is an organic compound capable of forming a salt with a sulfonic acid group and may include, for example, an aliphatic amine such as methylamine, ethylamine, dimethylamine, or trimethylamine; an alkanolamine such as monoethanolamine, diethanolamine, triethanolamine, or dimethylaminoethanolamine; an alicyclic amine such as cyclopropylamine or cyclohexylamine; an aromatic amine such as aniline or methylaniline; and a heterocyclic amine such as pyridine.

These cationic components may be used singly or in combination. In the cationic components, the metal ion or the quaternary ammonium compound, particularly, the alkali metal ion such as sodium ion is preferred as X.

Concretely, the preferred compound (I) includes, for example, a salt of N,N-bis(2-hydroxyC$_{2-4}$alkyl)-2-aminoC$_{1-4}$alkanesulfonic acid, such as sodium N,N-bis(2-hydroxyethyl)-2-aminomethanesulfonate, sodium N,N-bis(2-hydroxyethyl)-2-aminoethanesulfonate, sodium N,N-bis(3-hydroxypropyl)-2-aminoethanesulfonate, or tetramethylammonium N,N-bis(2-hydroxyethyl)-2-aminoethanesulfonate; and a salt of N-[2-(2-hydroxyC$_{2-4}$alkoxy)C$_{2-4}$alkyl]-N-(2-hydroxyC$_{2-4}$alkyl)-2-aminoC$_{1-4}$alkanesulfonic acid, such as sodium N-[2-(2-hydroxyethoxy)ethyl]-N-(2-hydroxyethyl)-2-aminoethanesulfonate. These compounds (I) may be used singly or in combination. In the compounds (I), the particularly preferred one includes, for example, an alkali metal salt of N,N-bis(2-hydroxyC$_{2-3}$alkyl)-2-aminoethanesulfonate, such as sodium N,N-bis(2-hydroxyethyl)-2-aminoethanesulfonate [compound (II)].

The lactone may include, for example, a $C_{3-10}$lactone such as β-propiolactone, γ-butyrolactone (GBL), γ-valerolactone, δ-valerolactone, γ-caprolactone, δ-caprolactone, and ε-caprolactone. These lactones may be used singly or in combination. In the lactones, a $C_{4-8}$lactone such as a valerolactone or a caprolactone, particularly, a caprolactone such as ε-caprolactone is preferred from the viewpoint of such as an industrial suitability, an economical efficiency, or others.

The proportion of the lactone may be at least 1 mole relative to 1 mole of the compound (I) and is, for example, at least 1.5 (1.5 to 100) moles relative to 1 mole of the compound (I), preferably at least 2 (2 to 50) moles relative to 1 mole of the compound (I), and more preferably at least 3 (3 to 30) moles relative to 1 mole of the compound (I).

The polyester polyol of the present invention may be an adduct of the lactone with the above-mentioned compound (I). The process for producing the polyester polyol is not particularly limited to a specific one. The process for producing the polyester polyol may include a conventional manner, for example, a process for ring-opening addition polymerizing a lactone, which is a cyclic ester compound. In the process, usually, the polyester polyol can be obtained through a consecutive or batch reaction by mixing and stirring the compound (I) used as an initiator and the lactone, which is a cyclic ester compound. The reaction temperature is, for example, about 100 to 230° C., preferably about 105 to 220° C., and more preferably about 110 to 200° C. (particularly about 120 to 180° C.). An exceedingly low reaction temperature slows the reaction speed. On the other hand, an exceedingly high reaction temperature tends to cause a side reaction (for example, decomposition of the lactone polymer and a cyclic lactone dimer) other than the addition reaction of the lactone, and the synthesis of an objective polyester polyol having a hydroxy group at a terminal becomes difficult. In addition, the polyester polyol tends to be colored. The reaction (stirring) time is, for example, about 1 to 72 hours, preferably about 2 to 48 hours, and more preferably about 3 to 36 hours (about 5 to 30 hours).

Moreover, in the polymerization reaction, the use of a polymerization catalyst is preferred. The polymerization catalyst to be used may include, for example, a variety of organic and inorganic metal compounds. In specific, in the light of the reactivity of the obtained polyester polyol, an organotitanium-series compound (for example, a tetra$C_{1-6}$alkyltitanate such as tetraethyl titanate, tetraisopropyl titanate, or tetrabutyl titanate), an organnotin-series compound (for example, dibutyltin oxide, dibutyltin laurate, stannous octylate, and a salt of a mono-n-butyltin fatty acid), or a tin halide-series compound (for example, a stannous halide such as stannous chloride, stannous bromide, or stannous iodide) may be used. The amount to be used of the catalyst relative to the total amount of the starting materials (the sum total amount of the lactone and the compound (I)) is, for example, about 0.1 to 1000 ppm (based on weight), preferably about 1 to 500 ppm, and more preferably about 10 to 300 ppm. An exceedingly small amount of the catalyst extremely slows the reaction speed, which hinders the synthesis of an objective polyester polyol having a hydroxy group at a terminal. On the other hand, an exceedingly large amount of the catalyst escalates the reaction speed, which increases an amount of a by-product and tends to color an objective product, however.

The polyester polyol of the present invention may contain a stabilizer such as a phenolic compound, an organophosphorus compound, or a hindered amine-series compound. Since the stabilizer can improve hue stability in the polymerization reaction, the stabilizer is preferably used in the polymerization reaction.

The phenolic compound may include a monophenol compound, a bisphenol compound, and a polyphenol compound. The monophenol compound may include, for example, 2,6-di-t-butyl-p-cresol, 2,6-diphenyl-4-octadecyloxyphenol, 3-(3,5-di-t-butyl-4-hydroxyphenyl)-propionate, distearyl(3,5-di-t-butyl-4-hydroxybenzyl)phosphonate, and 2-t-butyl-4-methyl-6-(2-acryloyloxy-3-t-butyl-5-methylbenzyl)phenol. The bisphenol compound may include, for example, 4,4'-isopropylidenediphenol (bisphenol A), thiodiethylene glycol bis[(3,5-di-t-butyl-4-hydroxyphenyl)propionate], 1,6-hexamethylenebis[(3,5-di-t-butyl-4-hydroxyphenyl)propionate], 1,6-hexamethylenebis[(3,5-di-t-butyl-4-hydroxyphenyl)propionic acid amide], triethylene glycol bis[(3-t-butyl-4-hydroxy-5-methylphenyl)propionate], 4,4'-thiobis(6-t-butyl-m-cresol), 2,2'-methylenebis(4-methyl-6-t-butylphenol), 2,2'-methylenebis(4-ethyl-6-t-butylphenol), 4,4'-butylidenebis(6-t-butyl-m-cresol), 2,2'-ethylidenebis(4,6-di-t-butylphenol), 2,2'-ethylidenebis(4-s-butyl-6-t-butylphenol), bis[2-t-butyl-4-methyl-6-(2-hydroxy-3-t-butyl-5-methylbenzyl)phenyl]terephthalate, and 3,9-bis[1,1-dimethyl-2-(3-(3-t-butyl-4-hydroxy-5-methylphenyl)propionyloxy)ethyl]-2,4,8,10-tetraoxaspiro[5.5]undecane.

The polyphenol compound may include, for example, 1,1,3-tris(2-methyl-4-hydroxy-5-t-butylphenyl)butane, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)-propionyloxyethyl]isocyanurate, bis[3,3-bis(4-hydroxy-3-t-butylphenyl)butylic acid]glycol ester, and tetrakis[methylene-3-(3,5-di-t-butyl-4-hydroxyphenyl)propionate]methane. These phenolic compounds may be used singly or in combination. In the phenolic compounds, the hindered phenol-series compound having a high-molecular weight, particularly, a hindered bisphenol compound having a high-molecular weight such as 3,9-bis[1,1-dimethyl-2-{3-(3-t-butyl-4-hydroxy-5-methylphenyl)propionyloxy}ethyl]-2,4,8,10-tetraoxaspiro[5.5]undecane and a hindered polyphenol compound having a high-molecular weight such as tetrakis[methylene-3-(3,5-di-t-butyl-4-hydroxyphenyl)propionate]methane.

The organic phosphorus compound may include, for example, a trialkyl phosphite (such as tridecyl phosphite), a monoalkyldiaryl phosphite [such as octyldiphenyl phosphite or 2,2'-methylenebis(4,6-di-t-butylphenyl)octyl phosphite], a dialkylmonoaryl phosphite [such as di(decyl)monophenyl phosphite], a tris(alkylaryl)phosphite [such as trisnonylphenyl phosphate or tris(2,4-di-t-butylphenyl)phosphite], an alkylpentaerythritol phosphite [such as di(tridecyl)pentaerythritol diphosphite, distearylpentaerythritol diphosphite, di(nonylphenyl)pentaerythritol diphosphite, bis(2,4-di-t-butylphenyl)pentaerythritoldiphosphite, or bis(2,6-di-t-butyl-4-methylphenyl)pentaerythritol diphosphite], a diphosphite [such as tetra(tridecyl)isopropylidenediphenol diphosphite or tetra(tridecyl)-4,4'-n-butylidenebis(2-t-butyl-5-methylphenol) diphosphite], a triphosphite [such as hexa(tridecyl)-1,1,3-tris(2-methyl-4-hydroxy-5-t-butylphenyl)butane triphosphite], a diphosphonite [such as tetrakis(2,4-di-t-butylphenyl)biphenylene diphosphonite], and tris[2-t-butyl-4-(3-t-butyl-4-hydroxy-5-methylphenylthio)-5-methylphenyl]phosphite], 9,10-dihydro-9-oxa-10-phosphaphenanthrene-10-oxide, and a phosphorus compound having a high-molecular weight {such as 6-[3-(3-t-butyl-4-hydroxy-5-methylphenyl)propoxy]-2,4,8,10-tetra-t-butyldibenz[d,f][1,3,2]-dioxaphosphepine}. Theseorganicphosphoruscompoundsmay be used singly or in combination. In the organic phosphorus compounds, an organic phosphite compound (for example, an organic phosphite compound having a branched $C_{3-6}$alkylphenyl group such as a t-butyl group), or a phosphorus compound having a high-molecular weight, particularly, a tris(branched $C_{3-6}$alkylphenyl group) phosphate such as tris(2,4-di-t-butylphenyl)phosphate or a phosphorus compound having a high-molecular weight is preferred.

The hindered amine-series compounds may include a compound having at least one 2,2,6,6-tetramethylpiperidyl group in the molecule, for example, 2,2,6,6-tetramethyl-4-piperidylbenzoate, N-(2,2,6,6-tetramethyl-4-piperidyl)dodecylsuccinic acid imide, 1-[(3,5-di-t-butyl-4-hydroxyphenyl)propionyloxyethyl]-2,2,6,6-tetramethyl-4-piperidyl-(3,5-di-t-butyl-4-hydroxyphenyl)propionate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-butyl-2-(3,5-di-t-butyl-4-hydroxybenzyl)malonate, N,N'-bis(2,2,6,6-tetramethyl-4-piperidyl)hexamethylene diamine, tetra(2,2,6,6-tetramethyl-4-piperidyl)butanetetracarboxylate, tetra(1,2,2,6,6-pentamethyl-4-piperidyl)butanetetracarboxylate, bis (2,2,6,6-tetramethyl-4-piperidyl)-di(tridecyl) butanetetracarboxylate, bis(1,2,2,6,6-pentamethyl-4-piperidyl)di(tridecyl)butanetetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[4,6-bis{N-(2,2,6,6-tetramethyl-4-piperidyl)butylamino}-1,3,5-triazine-2-yl]-1,5,8,12-tetraazadodecane, a condensation product of 1-(2-hydroxyethyl)-2,2,6,6-tetramethyl-4-piperidinol and dimethyl succinate, a condensation product of 2-t-octylamino-4,6-dichloro-s-triazine and N,N'-bis(2,2,6,6-tetramethyl-4-piperidyl)hexamethylenediamine, and a condensation product of N,N'-bis(2,2,6,6-tetramethyl-4-piperidyl)hexamethylene diamine and dibromoethane. These hindered amine-series compounds may be used singly or in combination.

These stabilizers may be used singly or in combination. In the stabilizers, the phenolic compound alone or a combination of the phenolic compound and the organic phosphate compound is preferably used. In a combination use of the phenolic compound and the organic phosphite compound, the ratio (weight ratio) of the phenolic compound relative to the organic phosphite compound is [the former/the latter] is about 90/10 to 10/90, and preferably about 70/30 to about 30/70. The amount of the stabilizer used (the total amount of a plurality of the stabilizers in the combination use) may be selected from the range of the amounts having no adverse effects on the reactivity. The amount of the stabilizer used relative to 100 parts by weight of the total amount of the starting materials (the sum total amount of the lactone and the compound (I)) is, for example, about 0.001 to 1 part by weight, preferably about 0.01 to 0.8 part by weight, and more preferably about 0.001 to 0.6 part by weight (particularly about 0.05 to 0.5 part by weight).

The hydroxyl value of the polyester polyol of the present invention is, for example, about 20 to 350 KOHmg/g, preferably about 30 to 295 KOHmg/g, and more preferably 40 to 280 KOHmg/g (particularly about 50 to 250 KOHmg/g). An exceedingly low hydroxyl value of the polyester polyol exceedingly increases the viscosity of the polyester polyol. On the other hand, an exceedingly high hydroxyl value deteriorates the flexibility of the polyester polyol.

The acid value of the polyester polyol of the present invention is, for example, not more than 5 KOHmg/g (for example, about 0.01 to 5 KOHmg/g), preferably not more than 4.5 KOHmg/g (about 0.05 to 4.5 KOHmg/g), and more preferably not more than 4 KOHmg/g (0.1 to 4 KOHmg/g). An exceedingly high acid value deteriorates the reactivity of the polyester polyol.

The molecular weight of the polyester polyol of the present invention (for example, the number average molecular weight) is about 300 to 6000, preferably about 350 to 4000, and more preferably about 400 to 3000 (particularly about 450 to 2300).

[Polyurethane Resin]

The polyurethane resin of the present invention is a polyurethane resin comprising the above-mentioned polyester polyol unit and obtained by a reaction of a polyol component comprising the above-mentioned polyester polyol with an organic polyisocyanate component.

The polyol component may comprise the above-mentioned polyester polyol. The polyol component may further comprise other polyol components. The other polyol component may include a conventional polyol component, for example, a polyol having a high-molecular weight (or a high-molecular weight polyol) and a polyol having a low-molecular weight (or a low-molecular weight polyol).

The high-molecular weight polyols may include, for example, a polyether polyol, a polyester polyol (excluding the polyester polyol of the present invention), a polycarbonate polyol, a silicone polyol, a polybutadiene polyol, and a polyolefinic polyol. These high-molecular weight polyols may be used singly or in combination. In the high-molecular weight polyols, the polyether polyol (for example, a poly$C_{2-6}$alkylene glycol such as a polyethylene glycol, a polypropylene glycol, or a polytetramethylene glycol) or the polyester polyol is preferred. In particular, the polyester polyols is preferred.

The polyester polyol may include a polyester polyol obtained by a condensation reaction of a diol with a dicarboxylic acid, a lactone-series polyester polyol, and others.

The polyester polyol obtained by the condensation reaction of a diol with a dicarboxylic acid is usually a bifunctional polyester diol having hydroxyl group at terminals and obtained by a reaction of a $C_{2-8}$alkanediol that may have a $C_{1-3}$ alkyl group with an aliphatic dicarboxylic acid or an aromatic dicarboxylic acid that have about 3 to 10 carbon atoms. Concrete examples of the polyester polyol may include, for example, a polyethylene adipate, a polyethylene butylene adipate, a polybutylene adipate, a polypropylene adipate, a polyhexamethylene adipate, a polyneopentylene adipate, a condensation product of 3-methyl-1,5-pentanediol and adipic acid, a condensation product of 2,4,4-trimethyl-1,6-hexanediol and/or 2,2,4-trimethyl-1,6-hexanediol and adipic acid, a condensation product of terephthalic acid and 1,6-hexanediol or 3-methyl-1,5-pentanediol, and a condensation product of terephthalic acid and isophthalic acid and/or adipic acid and 1,6-hexanediol or 3-methyl-1,5-pentanediol.

The lactone-series polyester polyols may include a polyester polyol in which the lactone is polymerized by ring-opening addition reaction using a short-chain polyol as an initiator. The after-mentioned polyol having a low-molecular weight may be used as the short-chain polyol. The lactones exemplified in the paragraph of the polyester polyol of the present invention may be used as the lactone.

These polyester polyols may be used singly or in combination. In the polyester polyols, the lactone-series polyester polyol such as a caprolactone-series polyester polyol is preferred.

The molecular weight of the high-molecular weight polyol (e.g., the weight-average molecular weight) is, for example, about 400 to 5000, preferably about 500 to 3000, and more preferably about 600 to 2000.

The polyol having a low-molecular weight may include a diol, a triol, a polyol, and others. The diol may include, for example, an alkanediol (for example, a $C_{2-12}$alkanediol such as ethylene glycol, propylene glycol, 1,3-butanediol, 1,4-butanediol, neopentyl glycol, 1,6-hexanediol, 2,2,4- and/or 2,4,4-trimethyl-1,6-hexanediol, 2,2,4-trimethyl-1,5-pentanediol, 1,10-decanediol, and 1,12-dodecanediol), a dialkylene glycol (for example, a di$C_{2-4}$alkylene glycol such as diethylene glycol or dipropylene glycol), a cycloalkanediol (for example, 1,4-cyclohexanedimethanol), a bisphenol (for example, bisphenol A), a dihydroxycarboxylic acid (for example, a dimethylol fatty acid such as dimethylolpropionic acid, dimethylolbutanoic acid, dimethylolpentanoic acid, dimethylolheptanoic acid, dimethyloloctanoic acid, or dimethyloloctanoic acid, dihydroxysuccinic acid, and dioxyadipic acid), and diethanolamine. The triol may include, for example, glycerin, trimethylolethane, trimethylolpropane, and triethanolamine. The polyol may include a tetraol (for example, pentaerythritol) and others. These polyols having low-molecular weights may be used singly or in combination. In the polyols having low-molecular weights, a $C_{2-6}$alkanediol such as 1,4-butanediol or neopentyl glycol is preferred. Incidentally, these polyols having low-molecular weights may be used as chain extenders.

In the other polyol components, the high-molecular weight polyol and the low-molecular weight polyol may be used in combination. The proportion (weight ratio) of the both polymers [the high-molecular weight polyol relative to the low-molecular weight polyol] is, for example, about 100/1 to 1/1, preferably about 50/1 to 2/1, and more preferably about 40/1 to 3/1.

In a combination use of the polyester polyol of the present invention and the other polyol component, the proportion of the other polyol component relative to the polyester polyol may be selected according to a required degree of hydrophilicity, required mechanical properties of the urethane resin, and others. The proportion (weight ratio) of both components [the polyester polyol/the other polyol component] may be selected from the range about 100/1 to 1/100, and is, for example, is about 10/1 to 1/50 (for example, about 5/1 to 1/30), preferably about 3/1 to 1/20, and more preferably about 2/1 to 1/10 (particularly about 1/1 to 1/5).

A conventional polyisocyanate that has been used for the production of a polyurethane may be used as an organic polyisocyanate in the polyurethane production. Such an organic polyisocyanate is not particularly limited to a specific one. Representative polyisocyanates include, for example, an aliphatic polyisocyanate [e.g., hexamethylene diisocyanate (HDI), trimethylhexamethylene diisocyanate, and lysine diisocyanate], an alicyclic diisocyanate [such as cyclohexane-1,4-diisocyanate, isophorone diisocyanate (IPDI), norbornene diisocyanate (NDI), hydrogenated xylylene diisocyanate, and hydrogenated bis(isocyanatophenyl)methane], an araliphatic polyisocyanate [e.g., 1,2 (or 1, 3 or 1,4)-xylylene diisocyanate (XDI) and tetramethylxylylene diisocyanate], an aromatic polyisocyanate [e.g., phenylene diisocyanate, 2,4 (or 2,6)-tolylene diisocyanate (TDI), and 3,5-diethyl-2,4-diisocyanatotoluene), naphthalene diisocyanate, diphenylmethane-2,4' (or 4,4')-diisocyanate (MDI), bis(isocyanatophenyl)methane, toluidine diisocyanate, and 1,3-bis(isocyanatophenyl)propane]. These organic polyisocyanates may be used singly or in combination. The organic polyisocyanate may be selected according to required properties of the polyurethane resin. For example, the aliphatic polyisocyanate such as HDI or the alicyclic polyisocyanate such as IPDI may be preferably used.

The proportion of the organic polyisocyanate relative to the polyol component is, in terms of equivalent ratio of the isocyanate group relative to the active hydrogen group of the polyol component [the isocyanate group/the active hydrogen group], for example, is about 1/1 to 2/1, preferably about 1.05/1 to 2/1, and more preferably about 1.05/1 to 1.6/1 (particularly about 1.05/1 to 1.5/1).

The polyurethane resin of the present invention may further comprise a chain extender and/or a chain terminating agent. The chain extender may include an alkanolamine (such as monoethanolamine), an aliphatic diamine (for example, a $C_{2-8}$alkanediamine such as ethylenediamine, propylenediamine, N,N-dimethylethylenediamine, or hexamethylenediamine), an alicyclic diamine (for example, 1,4-cyclohexanediamine, 3-aminomethyl-3,5,5-trimethylcyclohexylamine, isophoronediamine, dicyclohexylmethane-4,4'-diamine, 1,3-bis(aminomethyl) cyclohexane, and norbornanediamine), an aromatic diamine (for example, tolylenediamine and xylylenediamine), an aliphatic polyamine (for example, diethylenetriamine and triethylenetetramine), and a piperazine (such as 1,3-piperazine, 1,4-piperazine, 2-methyl-1,4-piperazine, and 2,5-dimethyl-1,4-piperazine). These chain extenders may be used singly or in combination. In the chain extenders, the preferred one includes the aliphatic diamines such as hexamethylenediamine, and others.

The chain terminating agent may include, a monofunctional compound having an active hydrogen, for example, a $C_{1-24}$monoalcohol such as methanol, ethanol, isopropanol, propanol, butanol, hexanol, lauryl alcohol, or cetyl alcohol, or an adduct thereof with an alkylene oxide (for example, an adduct with a $C_{2-4}$alkylene oxide such as ethylene oxide), an oxime such as methylethylketoxime, a lactam such as ε-caprolactam, and a monoamine such as dibutylamine. These chain terminating agents may be used singly or in combination. In the chain terminating agent, such as a $C_{1-12}$alcohol or an adduct of thereof with ethylene oxide is widely used.

Each proportion of the chain extender and the chain terminating agent relative to 100 parts by weight of the total amount of the starting materials (the sum total amount of the polyol component and the organic polyisocyanate) are, for example, about 0.001 to 20 parts by weight, preferably about 0.01 to 10 parts by weight, and more preferably about 0.1 to 5 parts by weight (particularly about 0.5 to 3 parts by weight).

The polyurethane resin of the present invention may further comprise, if necessary, a conventional additive, for example, other stabilizers (such as an antioxidant, a ultraviolet absorber, a heat stabilizer, or a light-resistant stabilizer), a coloring agent (such as a dye and a pigment), a filler, a lubricant (a lubricating agent), across linking agent or a curing agent, an antistatic agent, and an antiblocking agent. These additives may be used singly or in combination.

Since the resin contains the specific polyester polyol unit having a sulfonic acid (salt) group, the polyurethane resin of the present invention is an aqueous polyurethane resin having hydrophilicity. Moreover, since the polyurethane resin of the present invention is high hydrophilic, the polyurethane resin may be in the form of an aqueous emulsion or an aqueous solution.

The degree of hydrophilization of the polyurethane resin of the present invention practically depends on the proportion of the sulfonic acid (salt) group in the resin. That is, the content of the sulfonic acid (salt) group in the polyurethane resin may be appropriately changed according to the purposes. The proportion of the sulfonic acid (salt) group may be manipulated, for example, by changing the proportion or the molecular weight of the polyester polyol of the present invention as long as the required properties of the polyurethane resin of the present invention is not deteriorated.

In a use of the polyurethane resin as an aqueous emulsion, particularly the polyurethane resin disperses without using a surfactant, the proportion (content) of the sulfonic acid (salt) group relative to the polyurethane resin (solid content) may be selected from the range of about 0.01 to 10% by weight, and is usually about 0.1 to 5% by weight, preferably about 0.2 to 4% by weight, and more preferably about 0.3 to 3% by weight. An exceedingly low proportion of the sulfonic acid (salt) group causes an insufficient degree of hydrophilization of the polyurethane resin. On the other hand, an exceedingly high proportion of the sulfonic acid (salt) group extremely increases the degree of the hydrophilization of the polyurethane resin, and the resin does not disperse. When an aqueous emulsion of such a resin is particularly used as a coating agent, the film properties of the resin are deteriorated.

The polyurethane resin may be dispersed in an aqueous emulsion by a conventional a surfactant (a dispersing agent).

As mentioned above, the proportion of the sulfonic acid (salt) group may be manipulated so that the resin may disperse. In the polyurethane aqueous emulsion, the proportion of water to disperse the polyurethane resin (polyurethane prepolymer) is not particularly limited to a specific one as long as an aqueous dispersion of the resin can be prepared. The proportion of the water may be selected from the range of the solid content concentration of the polyurethane resin of about 1 to 90% by weight, for example, about 5 to 80% by weight, preferably about 10 to 70% by weight, and more preferably about 15 to 50% by weight (particularly about 20 to 40% by weight). The viscosity of the aqueous emulsion (at 25° C.) is, in the light of applicability and others, for example, about 10 to 500 mPa·s, preferably about 30 to 400 mPa·s, and more preferably about 50 to 300 mPa·s (particularly about 100 to 250 mPa·s).

In the aqueous solution containing the polyurethane resin, the concentration of the polyurethane resin in the aqueous solution is, for example, about 1 to 70% by weight, preferably about 3 to 50% by weight, and more preferably about 5 to 40% by weight (particularly about 10 to 30% by weight).

Accordingly, polyurethane resin of the present invention is usually prepared to have a formation (or a composition) ensuring a good coating of the aqueous polyurethane resin by evaporating water at a room temperature to 180° C.

[Process for Producing Polyurethane Resin]

The process for producing the polyurethane resin of the present invention is not particularly limited to a specific one as long as the production process uses a polyol component comprising the polyester polyol of the present invention and an organic polyisocyanate. A conventional single-step or multi-step isocyanate polyaddition reaction process may be used.

In the single-step process, the polyester polyol of the present invention and the organic polyisocyanate, and if necessary, the other polyol component and the chain extender are subjected to a reaction in the above-mentioned equivalent ratio of the active hydrogen group of the polyol component relative to the isocyanate group. The reaction temperature is usually, about 20 to 150° C., preferably about 30 to 120° C., more preferably about 30 to 100° C. (particularly about 40 to 80° C.). The reaction time is, for example, about 1 to 30 hours, preferably about 2 to 20 hours, and more preferably about 3 to 15 hours (particularly about 4 to 10 hours). The reaction may usually be conducted under an atmospheric pressure. The reaction may also be conducted under a reduced pressure.

The reaction in the single-step process may be conducted in the presence of a solvent inactive to an isocyanate group. The solvent inactive to an isocyanate group may include, for example, an amide (such as N-methylpyrrolidone, dimethylformamide, or dimethylacetoamide), a ketone (for example, an aliphatic ketone such as acetone, methyl ethyl ketone, or methyl isobutyl ketone, and an alicyclic ketone such as cyclohexanone), an ether (such as dioxane or tetrahydrofuran), an ester (such as ethyl acetate or butyl acetate), and an aromatic hydrocarbon (such as benzene, toluene, or xylene). These solvents may be used singly or in combination. In the solvents, the aliphatic ketone such as methyl ethyl ketone is usually employed. The amount of the solvent relative to 100 parts by weight of the total amount of the starting materials (the sum total amount of the polyol component and the organic polyisocyanate) is, for example, not more than 5000 parts by weight (for example, about 10 to 5000 parts by weight), preferably about 50 to 3000 parts by weight, and more preferably about 100 to 1000 parts by weight (particularly about 150 to 500 parts by weight).

To accelerate the reaction of the single-step process, a conventional urethanization catalyst may be used, for example, an amine-series catalyst (a tertiary amine such as triethylenediamine, N-methylmorpholine, or triethylamine), a tin-series catalyst (for example, an organotin-series compound such as dibutyltin dilaurate), and a lead-series catalyst (an organolead-series compound such as lead octylate).

The multi-step isocyanate polyaddition process is not particularly limited to a specific one as long as the polyaddition process is conducted in several steps. The aqueous emulsion (or the aqueous solution) may be produced, for example, by the following multi-step process.

In specific, the aqueous emulsion (or the aqueous solution) may be produced by (step A) allowing a polyol component at least containing the polyester polyol of the present invention to react with an organic polyisocyanate in a solvent inactive to an isocyanate group and then (step B) adding a chain extender and water thereto and distilling off the solvent. In the step A, for example, the polyester polyol of the present invention and the organic polyisocyanate compound, and if necessary, the other polyol component are subjected to the reaction in a solvent inactive to the isocyanate group. The above-mentioned solvent may be used as the solvent inactive to an isocyanate group. The aliphatic ketone such as methyl ethyl ketone is usually employed. The proportion of the solvent relative to 100 parts by weight of the total amount of the starting materials (the sum total amount of the polyol component and the organic polyisocyanate) may be, not more than 300 parts by weight, and is usually not more than 200 parts by weight (for example, about 1 to 200 parts by weight), preferably about 5 to 150 parts by weight, and more preferably about 10 to 100 parts by weight (particularly about 10 to 50 parts by weight).

The reaction temperature is usually moderate (or mild), for example, about 20 to 150° C., preferably about 20 to 80° C., and more preferably about 30 to 80° C. (particularly about 40 to 80° C.). The reaction time is usually about 3 to 20 hours, and preferably about 4 to 10 hours. The reaction may usually be conducted under an atmospheric pressure. The reaction may also be conducted under a reduced pressure. To accelerate the reaction, the above-mentioned conventional urethanization catalyst may be used.

In the step B, after adding the chain extender and the water (if necessary, a hydrophilic solvent) to the reaction solution obtained by the step A, the solvent inactive to an isocyanate group are distilled off. If necessary, after distilling off the solvent, a predetermined amount of water may be added to the residue to adjust the residue to a desired solid content concentration.

The chain extenders exemplified in the paragraph of the polyurethane resin may be used as the chain extender. Among the chain extenders, the polyamine, for example, a $C_{2-8}$alkanediamine such as hexamethylenediamine is preferred. The proportion of the chain extender relative to 100 parts by weight of the prepolymer obtained by the step A is; for example, about 0.001 to 20 parts by weight, preferably about 0.01 to 10 parts by weight, and more preferably about 0.1 to 5 parts by weight (particularly about 0.5 to 3 parts by weight).

The proportion of the water relative to 100 parts of the prepolymer obtained by the step A is, for example, about 30 to 1000 parts by weight, preferably about 50 to 500 parts by weight, and more preferably about 100 to 300 parts by weight (particularly about 100 to 200 parts by weight).

The hydrophilic solvents may include, for example, a ketone such as acetone, a lower alcohol such as methanol and ethanol, and ethylene glycol. These hydrophilic solvents may be used singly or in combination. In the hydrophilic solvents, an aliphatic ketone such as acetone is widely used. The proportion of the hydrophilic solvent used relative to 100 parts by weight of the water is selected from the range of not more than 100 parts by weight, and is, for example, about 5 to 70 parts by weight, preferably about 10 to 50 parts by weight, and more preferably about 15 to 40 parts by weight.

Incidentally, the aqueous emulsion or the aqueous solution may contain the additives exemplified in the paragraph of the above-mentioned polyurethane resin, in addition, a dispersing agent (a surfactant), an emulsion stabilizer, a flow adjuster, a water-repellent agent, an antifoaming agent, a coatability improvable agent, a thickener, and a gelling agent.

INDUSTRIAL APPLICABILITY

Since the manipulation of the HLB value of the polyurethane resin or the introduction of a hydrophobic group into the resin depends on the proportion of the sulfonic acid (salt) group of the polyester polyol of the present invention, the water-solubility or the water dispersibility of the polyurethane resin can be easily changed. Moreover, since the polyester polyol has a sulfonic acid (salt) group, the properties attributing to the characters of the functional group and the counter ion can be imparted to an obtained coating (layer) of the polyurethane resin. The use of the polyester polyol of the present invention ensures, for example, an improved dispersibility of an inorganic substance, an improved adhesion property, antistatic property, conductivity, and water-absorbing property, and condition of texture.

Accordingly, the polyurethane resin obtained from the polyester polyol of the present invention may be used as, for example, a polymeric surfactant, an agent for urethanization treatment that is water soluble or self-dispersible, a blocked isocyanate, a water-retention agent, an agent for hydrophilic treatment, a coating agent, and a urethane resin having an improved dispersibility of a dye or an inorganic substances. Moreover, the aqueous emulsion or the aqueous solution (particularly the aqueous emulsion) of the polyurethane resin obtained from the polyester polyol of the present invention can be used in various fields such as a fabric finishing agent, a water-base paint, an adhesive, or various coating agents. In particular, since the other components other than the polyester polyol of the present invention can be selected from the wide range as mentioned above and used in a wide combination, the aqueous emulsion of the present invention that is used as a coating agent (such as a paint, or a printing ink) not only is suitably applied to surface coating for a variety of base materials (such as a metal, a plastic material or a polymer, an inorganic material, a paper, or a wood) but also gives a good film through an evaporation of water by drying.

EXAMPLES

Hereinafter, the following examples are intended to describe this invention in further detail and should by no means be interpreted as defining the scope of the invention. Evaluation methods of the solubility of the polyol component in the solvent and the reactivity of the polyol component with an isocyanate group are shown as follows. In addition, the appearance of the polyol component and the solubility of polyurethane resin were visually observed. Incidentally, in Examples, "part" and "%" mean "part by weight" and "% by weight", respectively.

[Solubility of Polyol Component]

Each of solvents (50 parts) was added to 50 parts of a polyol component to evaluate the compatibility of the component with the solvent in accordance with the following the evaluation criteria. Incidentally, for the evaluation, the following four solvents were used; dimethylformamide (DMF), N-methyl-2-pyrrolidone (NMP), acetone, and methyl ethyl ketone (MEK).

A: Polyol component is completely dissolved.

B: Polyol component is not dissolved and solution was unclear.

[Reactivity (Reaction Rate) of Polyol Component with Isocyanate Group]

Using isophorone diisocyanate, reactivity of a polyol component with an isocyanate group was evaluated as follows. To a 300 ml 4-neck flask, a polyol component and MEK (MEK concentration of 50% in total) were added and the mixture was heated to 75° C. in an oil bath. Then, isophorone diisocyanate was added dropwise into the mixture so as to the isocyanate group (NCO) relative to hydroxyl group (OH) in the equivalent ratio (NCO/OH) to be 0.9. After one hour, the residual isocyanate group (the residual NCO) (%) was determined, and then according to the following formula, a reaction rate was calculated from the theoretical unreacted isocyanate group (theoretical unreacted NCO).

Reaction rate (%)=[(theoretical unreacted NCO−residual NCO)/theoretical unreacted NCO]×100

Incidentally, in the determination, a tetrahydrofuran (THF) solution containing 0.1N di-n-butylamine and bromophenol blue as an indicator were used. The calculated reaction rate was evaluated based on the following the criteria.

A: Reaction rate is not less than 80%.

B: Reaction rate is less than 80%.

[Viscosity]

The viscosity (mPa·s) of a polyol component at 75° C. and the viscosity (mPa·s) of a polyurethane resin solution or dispersion at 25° C. were measured by using a B type viscometer (BH model manufactured by Tokyo Keiki Co. Ltd.).

Example 1

Production Example of Polyester Polyol

A 4-neck flask equipped with a stirrer, a thermometer, a condenser, and a nitrogen gas inlet was charged with 1059.2 parts of an ε-caprolactone ("PLACCEL M" manufactured by Daicel Chemical Industries, Ltd.), 940.8 parts of sodium N,N-bis(2-hydroxyethyl)-2-aminoethanesulfonate ("DOS-250" manufactured by Hopax Chemicals Mfg. Co., Ltd.) as an initiator, 0.4 part of a tetra-n-butoxytitanium catalyst, and 4 parts of a phenol-series stabilizer ("IRGANOX 1010" manufactured by Ciba Specialty Chemicals K.K.), and polymerization was conducted at 120° C. for 16 hours under a nitrogen flow. FIG. 1 shows a spectrum of $^1$H-NMR of the obtained product. From FIG. 1, it is clear that a lactone ester derivative having a hydroxyl group at a terminal was obtained by addition of a lactone. Moreover, regarding the obtained product, the properties, the solubility in a solvent, and the reactivity with an isocyanate group were evaluated. The results are shown in Table 1.

Example 2

Production Example of Polyester Polyol

Figure 2:
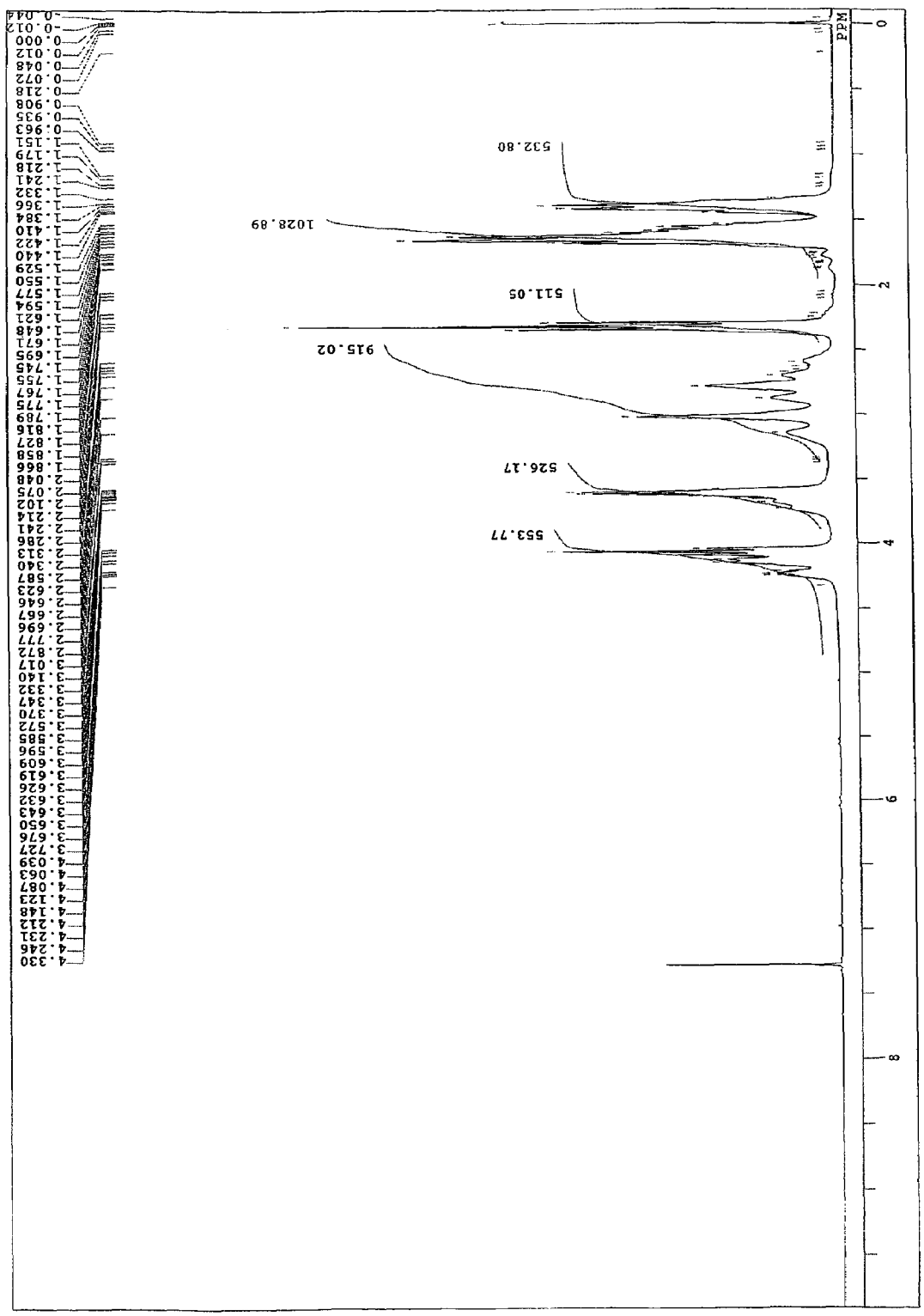
FIG. 2 shows a $^1$H-NMR spectrum of the polyester polyol obtained in Example 2.

A 4-neck flask equipped with a stirrer, a thermometer, a condenser, and a nitrogen gas inlet was charged with 1059.2 parts of an ε-caprolactone ("PLACCEL M" manufactured by Daicel Chemical Industries, Ltd.), 940.8 parts of sodium N,N-bis(2-hydroxyethyl)-2-aminoethanesulfonate ("DOS- 250" manufactured by Hopax Chemicals Mfg. Co., Ltd.) as an initiator, 0.4 part of a stannous chloride catalyst, and 4 parts of a phenol-series stabilizer ("IRGANOX 1010" manufactured by Ciba Specialty Chemicals K.K.), and polymerization was conducted at 120° C. for 16 hours under a nitrogen flow. FIG. 2 shows a spectrum of $^1$H-NMR of the obtained product. From FIG. 2, it is clear that the lactone ester derivative having a hydroxyl group at a terminal was obtained by addition of a lactone. Moreover, the evaluation results of the obtained product are shown in Table 1.

Example 3

Production Example of Polyester Polyol

A 4-neck flask equipped with a stirrer, a thermometer, a condenser, and a nitrogen gas inlet was charged with 1059.2 parts of an ε-caprolactone ("PLACCEL M" manufactured by Daicel Chemical Industries, Ltd.), 940.8 parts of sodium N,N-bis(2-hydroxyethyl)-2-aminoethanesulfonate ("DOS-250" manufactured by Hopax Chemicals Mfg. Co., Ltd.) as an initiator, 0.4 part of a mono-n-butyltin fatty acid salt catalyst, and 7 parts of a phenol-series stabilizer ("IRGANOX 1010" manufactured by Ciba Specialty Chemicals K.K.), and polymerization was conducted at 120° C. for 24 hours under nitrogen flow. The evaluation results of the obtained product are shown in Table 1.

Example 4

Production Example of Polyester Polyol

A 4-neck flask equipped with a stirrer, a thermometer, a condenser, and a nitrogen gas inlet was charged with 1059.2 parts of an ε-caprolactone ("PLACCEL M" manufactured by Daicel Chemical Industries. Ltd.), 940.8 parts of sodium N,N-bis(2-hydroxyethyl)-2-aminoethanesulfonate ("DOS-250" manufactured by Hopax Chemicals Mfg. Co., Ltd.) as an initiator, 1.9 parts of a mono-n-butyltin fatty acid salt catalyst, 0.1 part of a phenol-series stabilizer ("IRGANOX 1010" manufactured by Ciba Specialty Chemicals K. K.), and 0.1 part of an organic phosphate compound ("IRGAFOS 168" manufactured by Ciba Specialty Chemicals K.K.), and polymerization was conducted at 120° C. for 14 hours under nitrogen flow. The evaluation results of the obtained product are shown in Table 1.

Example 5

Production Example of Polyester Polyol

A 4-neck flask equipped with a stirrer, a thermometer, a condenser, and a nitrogen gas inlet was charged with 1529.6 parts of an ε-caprolactone ("PLACCEL M" manufactured by Daicel Chemical Industries, Ltd.), 470.4 parts of sodium N,N-bis(2-hydroxyethyl)-2-aminoethanesulfonate ("DOS-250" manufactured by Hopax Chemicals Mfg. Co., Ltd.) as an initiator, 1.9 parts of a tetra-n-butoxytitanium catalyst, and 8 parts of a phenol-series stabilizer ("ADEKASTAB AO-80" manufactured by Asahi Denka Co., Ltd.), and polymerization was conducted at 110° C. for 8 hours under nitrogen flow. The evaluation results of the obtained product are shown in Table 1.

Example 6

Production Example of Polyester Polyol

A 4-neck flask equipped with a stirrer, a thermometer, a condenser, and a nitrogen gas inlet was charged with 1764.8 parts of an ε-caprolactone ("PLACCEL M" manufactured by Daicel Chemical Industries, LTD.), 235.2 parts of sodium N,N-bis(2-hydroxyethyl)-2-aminoethanesulfonate ("DOS-250" manufactured by Hopax Chemicals Mfg. Co., Ltd.) as an initiator, 0.4 part of a stannous chloride catalyst, 4 parts of a phenol-series stabilizer ("Sumilizer GA-80" manufactured by Sumitomo Chemical Co., Ltd.), and 4 parts of an organic phosphite compound ("Sumilizer GP" manufactured by Sumitomo Chemical Co., Ltd.), and polymerization was conducted at 120° C. for 18 hours under nitrogen flow. The evaluation results of the obtained product are shown in Table 1.

Example 7

Production Example of Polyester Polyol

A 4-neck flask equipped with a stirrer, a thermometer, a condenser, and a nitrogen gas inlet was charged with 1059.2 parts of an ε-caprolactone ("PLACCEL M" manufactured by Daicel Chemical Industries, Ltd.), 940.8 parts of sodium N,N-bis(2-hydroxyethyl)-2-aminoethanesulfonate ("DOS-250" manufactured by Hopax Chemicals Mfg. Co., Ltd.) as an initiator, 4 parts of a para-toluene sulfonic acid catalyst, and 16 parts of a phenol-series stabilizer ("IRGANOX 1010" manufactured by Ciba Specialty Chemicals K.K.), and polymerization was conducted at 180° C. for 26 hours under nitrogen flow. The evaluation results of the obtained product are shown in Table 1.

Example 8

Production Example of Polyester Polyol

A 4-neck flask equipped with a stirrer, a thermometer, a condenser, and a nitrogen gas inlet was charged with 1529.6 parts of an ε-caprolactone ("PLACCEL M" manufactured by Daicel Chemical Industries. Ltd.), 470.4 parts of sodium N,N-bis(2-hydroxyethyl)-2-aminoethanesulfonate ("DOS-250" manufactured by Hopax Chemicals Mfg. Co., Ltd.) as an initiator, and 7 parts of a phenol-series stabilizer ("IRGANOX 1010" manufactured by Ciba Specialty Chemicals K.K.), and polymerization was conducted at 200° C. for 20 hours under nitrogen flow. The evaluation results of the obtained product are shown in Table 1.

Example 9

Production Example of Polyester Polyol

A 4-neck flask equipped with a stirrer, a thermometer, a condenser, and a nitrogen gas inlet was charged with 1764.8 parts of an ε-caprolactone ("PLACCEL M" manufactured by Daicel Chemical Industries. Ltd.), 235.2 parts of sodium N,N-bis(2-hydroxyethyl)-2-aminoethanesulfonate ("DOS-250" manufactured by Hopax Chemicals Mfg. Co., Ltd.) as an initiator, and 0.4 part of a starmous chloride catalyst, and polymerization was conducted at 180° C. for 18 hours under nitrogen flow. The evaluation results of the obtained product are shown in Table 1.

Comparative Example 1

Sodium N,N-bis(2-hydroxyethyl)-2-aminoethanesulfonate ("DOS-250" manufactured by Hopax Chemicals Mfg. Co., Ltd.) was used alone. Incidentally, the obtained polyol component is generally powder form. The evaluation results of the obtained polyol component are shown in Table 1.

TABLE 1

|  | Examples |  |  |  |  |  |  |  |  | Comparative |
|---|---|---|---|---|---|---|---|---|---|---|
|  | 1 | 2 | 3 | 4 | 5 | 6 | 7 | 8 | 9 | Example 1 |
| Properties |  |  |  |  |  |  |  |  |  |  |
| OH value (KOHmg/g) | 222.7 | 225 | 223.9 | 218.3 | 107.1 | 55.6 | 218 | 98.7 | 46.8 | impossible to determine |
| Acid value (KOHmg/g) | 1.1 | 1.3 | 1.8 | 3.4 | 2.8 | 2.0 | 13.7 | 7.5 | 9.5 | impossible to determine |
| Appearance (by visual observation) | light yellow clear | light yellow clear | light yellow clear | light yellow clear | light yellow | light yellow | light yellow clear | brown | brown | white powder |
| Viscosity (mPa·s/75° C.) | 4965 | 4955 | 4985 | 5025 | 2715 | 2345 | 6050 | 5845 | 5300 | — |
| Solubility |  |  |  |  |  |  |  |  |  |  |
| DMF | A | A | A | A | A | A | A | A | A | B |
| NMP | A | A | A | A | A | A | A | A | A | B |
| Acetone | A | A | A | A | A | A | B | B | B | B |
| MEK | A | A | A | A | A | A | A | B | B | B |
| Reaction rate | A | A | A | A | A | A | B | A | A | B |

As apparent from Table 1, the polyester polyols in Examples 1 to 6 had high solubilities in each solvent and high reaction rates. Incidentally, the polyester polyol in Example 7 had a low solubility in acetone and a low reaction rate. The polyester polyols in Examples 8 and 9 had low solubilities in acetone and MEK. On the other hand, the polyol component in Comparative Example 1 had low solubilities in each solvent and a low reaction rate.

Example 10

Production Example of Aqueous Polyurethane Resin

A 4-neck flask equipped with a stirrer, a thermometer, a condenser, and a nitrogen gas inlet was charged with 9.4 g of the polyester polyol obtained in Example 1, 50 g of a bifunctional polyester polyol ("PCL210CP" manufactured by Daicel Chemical Industries, Ltd., and having an average molecular weight of 1000), 48.2 g of isophorone diisocyanate, 12.4 g of 1,4-butanediol, and 280 g of methyl ethyl ketone, and reaction was conducted at 75° C. for 8 hours to obtain a homogeneous urethane solution. The obtained polyurethane solution had a solid content of 30.8% and a viscosity of 57000 mPa·s (25° C.). Incidentally, after adding 400 g of a water to the solution containing the polyurethane resin and stirring the mixture well, it was confirmed that the solution containing the polyurethane resin was soluble.

Example 11

Production Example of Aqueous Polyurethane Resin

A 4-neck flask equipped with a stirrer, a thermometer, a condenser, and a nitrogen gas inlet was charged with 41.3 g of the polyester polyol obtained in Example 5, 20.2 g of a bifunctional polyester polyol ("PCL210CP" manufactured by Daicel Chemical Industries, Ltd., and having an average molecular weight of 1000), 47.8 g of isophorone diisocyanate, 10.7 g of 1,4-butanediol, and 280 g of methyl ethyl ketone, and reaction was conducted at 75° C. for 8 hours to obtain a homogeneous urethane solution. The obtained solution containing the polyurethane resin had a solid content of 30.5% and a viscosity of 49000 mPa·s (25° C.). Incidentally, after adding 400 g of a water to the solution containing the polyurethane resin and stirring the mixture well, it was confirmed that the solution containing the polyurethane resin was soluble.

Example 12

Production Example of Aqueous Polyurethane Resin

A 4-neck flask equipped with a stirrer, a thermometer, a condenser, and a nitrogen gas inlet was charged with 20.4 g of the polyester polyol obtained in Example 6, 40.1 g of a bifunctional polyester polyol ("PCL210CP" manufactured by Daicel Chemical Industries, Ltd., and having an average molecular weight of 1000), 50.4 g of isophorone diisocyanate, 9.1 g of 1,4-butanediol, and 280 g of methyl ethyl ketone, and reaction was conducted at 75° C. for 8 hours to obtain a homogeneous urethane solution containing a polyurethane resin. The obtained solution containing the polyurethane had a solid content of 30.9% and a viscosity of 47000 mPa·s (25° C.). Incidentally, after adding 400 g of a water to the solution containing the polyurethane resin and stirring the mixture well, it was confirmed that the solution containing the polyurethane resin was soluble.

Comparative Example 2

After a 4-neck flask equipped with a stirrer, a thermometer, a condenser, and a nitrogen gas inlet was charged with 27.8 parts of sodium N,N-bis(2-hydroxyethyl)-2-aminoethanesulfonate ("DOS-250" manufactured by Hopax Chemicals Mfg. Co., Ltd.), 70.9 g of isophorone diisocyanate, 21.3 g of 1,4-butanediol, and 280 g of methyl ethyl ketone, and the reaction was started at 75° C. Sodium N,N-bis(2-hydroxyethyl)-2-aminoethanesulfate was not soluble in the solvent, and the objective urethane was not able to obtain.

Thus, it was confirmed that the polyester polyols were used without difficulty and were able to impart high hydrophilicities to the polymers in Examples 10 to 12 while it was difficult to use the polyol component in Comparative Example 2.

Example 13

Production Example of Aqueous Emulsion

A 4-neck flask equipped with a stirrer, a thermometer, a condenser, and a nitrogen gas inlet was charged with 23.7 g of the polyester polyol obtained in Example 1, 49.5 g of a bifunctional polyester polyol ("PCL210CP" manufactured by Daicel Chemical Industries, Ltd., and having an average molecular weight of 1000), 42.4 g of isophorone diisocyanate, 4.5 g of 1,4-butanediol, and 30 g of methyl ethyl ketone, and reaction was conducted at 75° C. for 6 hours. Thereafter, the reaction mixture was cooled to 40° C. To the mixture was added methyl ethyl ketone to give a prepolymer solution having a solid content of 52% and a residual NCO of 0.72 mmol/g. To 200 g of the obtained prepolymer solution, 68 g of acetone was added, and then 218.3 g of an ion-exchanged water and 2.1 g of hexamethylenediamine were added thereto and mixed. From the mixture, methyl ethyl ketone and acetone were removed under a reduced pressure to obtain an aqueous dispersion of a urethane resin having a solid content of 34%, a viscosity of 150 mPa·s, and a pH of 7.1.

Example 14

Production Example of Aqueous Emulsion

A 4-neck flask equipped with a stirrer, a thermometer, a condenser, and a nitrogen gas inlet was charged with 23.6 g of the polyester polyol obtained in Example 1, 38 g of a bifunctional polyester polyol ("PCL210CP" manufactured by Daicel Chemical Industries, Ltd., and having an average molecular weight 1000), 54.9 g of isophorone diisocyanate, 3.5 g of 1,4-butanediol, and 30 g of methyl ethyl ketone, and reaction was conducted at 75° C. for 6 hours. Thereafter, the mixture was cooled to 40° C. and, methyl ethyl ketone was added to the mixture. The obtained solution containing a prepolymer had a solid content of 52% and a residual NCO of 0.93 mmol/g. To 200 g of the obtained prepolymer solution, 69 g of acetone was added, and 242.2 g of ion-exchanged water and 3.8 g of hexamethylenediamine were added thereto and mixed. From the mixture, methyl ethyl ketone and acetone were removed under a reduced pressure to obtain an aqueous dispersion of a urethane resin having a solid content of 33%, a viscosity of 200 mPa·s, and a pH of 7.2.

Comparative Examples 3 to 4

Except for using sodium N,N-bis(2-hydroxyethyl)-2-aminoethanesulfonate instead of the polyester polyol obtained in Example 1, the same manner in Example 13 or 14 was conducted. Sodium N,N-bis(2-hydroxyethyl)-2-aminoethanesulfonate was not soluble in methyl ethyl ketone as a solvent. The reaction did not proceed, and an aqueous dispersion of the polymer was not obtained.

The invention claimed:

1. A polyester polyol in which a lactone is ring-opening addition polymerized with a compound represented by the following formula (I):

[Formula 1]

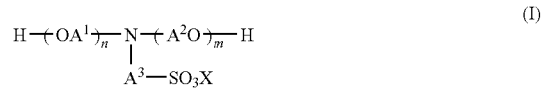

wherein each of $A^1$ and $A^2$ represents an alkylene group having not less than 2 carbon atoms, $A^3$ represents an alkylene group, X represents a cationic component, and each of n and m represents an integer of not less than 1.

2. A polyester polyol according to claim 1, wherein, in the formula (I), each of $A^1$ and $A^2$ is a $C_{2-4}$ alkylene group, $A^3$ is a $C_{1-4}$ alkylene group, X is a metal ion or a quaternary ammonium compound, and each of n and m is 1 or 2.

3. A polyester polyol according to claim 1, wherein the compound represented by the formula (I) is a compound represented by the formula (II).

[Formula 2]

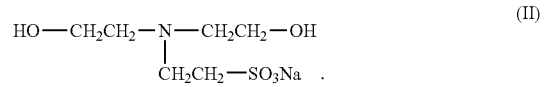

4. A polyester polyol according to claim 1, wherein the lactone is a $C_{4-8}$ lactone.

5. A polyester polyol according to claim 1, wherein the lactone is a caprolactone.

6. A polyester polyol according to claim 1, which has a hydroxyl value of 35 to 295 KOHmg/g and an acid value of not more than 5 KOHmg/g.

7. A polyester polyol according to claim 1, which has a hydroxyl value of 40 to 280 KOHmg/g and an acid value of 0.01 to 5 KOHmg/g.

8. A process for producing a polyester polyol, which comprises ring-opening addition polymerizing a lactone with a compound represented by the formula (I):

[Formula 3]

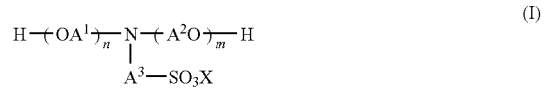

wherein $A^1$, $A^2$, $A^3$, X, n, and m have the same meanings as defined above.

9. A process according to claim 8, wherein the proportion of the lactone is 1.5 to 100 moles relative to 1 mole of the compound represented by the formula (I).

10. A process according to claim 8, wherein the ring-opening addition polymerization is carried out in the presence of at least one stabilizer selected from the group consisting of a phenolic compound, an organic phosphorus compound, and a hindered amine-series compound.

11. A process according to claim 10, wherein the proportion of the stabilizer is 0.001 to 1 part by weight relative to 100 parts by weight of the total amount of the starting materials.

12. A process according to claim 8, wherein the ring-opening addition polymerization is carried out by adding at least one polymerization catalyst selected from the group consisting of an organotitanium-series compound, an organotin-series compound, and a tin halide-series compound, in a proportion of 0.1 to 1000 ppm by weight relative to the total amount of the starting materials.

13. A polyurethane resin containing a polyester polyol recited in claim 1 as a constitutional unit.

14. A polyurethane resin according to claim 13, which is in a form of an aqueous emulsion or an aqueous solution.

15. A process for producing a polyurethane resin, which comprises allowing a polyol component at least containing a polyester polyol recited in claim 1, to react with an organic polyisocyanate.

16. A process according to claim 15, wherein the polyol component at least containing the polyester polyol in which a lactone is ring-opening addition polymerized with a compound represented by the following formula (I):

[Formula 1]

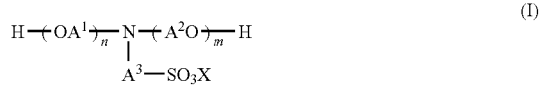

wherein each of $A^1$ and $A^2$ represents an alkylene group having not less than 2 carbon atoms, $A^3$ represents an alkylene group, X represents a cationic component, and each of n and m represents an integer of not less than 1 is allowed to react with the organic polyisocyanate in a solvent inactive to the isocyanate group, and which further comprises adding a chain extender and a water to the reaction mixture and distilling off the solvent to give an aqueous emulsion containing a polyurethane resin.

17. A process according to claim 15, wherein an equivalent ratio of the isocyanate group relative to the active hydrogen group of the polyol component [the isocyanate group/the active hydrogen group] is 1/1 to 2/1.

* * * * *